United States Patent
Sun et al.

(10) Patent No.: US 11,204,590 B2
(45) Date of Patent: Dec. 21, 2021

(54) STATE ESTIMATION METHOD FOR HEATING NETWORK IN STEADY STATE BASED ON BILATERAL EQUIVALENT MODEL

(71) Applicant: Tsinghua University, Beijing (CN)

(72) Inventors: Hongbin Sun, Beijing (CN); Qinglai Guo, Beijing (CN); Bin Wang, Beijing (CN); Tongtian Sheng, Beijing (CN); Boming Zhang, Beijing (CN); Wenchuan Wu, Beijing (CN); Mingye Zhang, Beijing (CN); Jinni Dong, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 16/844,356

(22) Filed: Apr. 9, 2020

(65) Prior Publication Data

US 2020/0233387 A1    Jul. 23, 2020

Related U.S. Application Data

(63) Continuation of application No. PCT/CN2017/114463, filed on Dec. 4, 2017.

(30) Foreign Application Priority Data

Oct. 16, 2017 (CN) .......................... 201710957867.X

(51) Int. Cl.
  *G06F 11/30* (2006.01)
  *G05B 13/04* (2006.01)
  (Continued)

(52) U.S. Cl.
  CPC ....... *G05B 13/048* (2013.01); *F24D 19/1006* (2013.01); *G01F 1/86* (2013.01)

(58) Field of Classification Search
  CPC .................................................. G05B 13/048
  See application file for complete search history.

(56) References Cited

U.S. PATENT DOCUMENTS 6,095,426 A * 8/2000 Ahmed ................. G05B 11/42
                                                       236/49.3
7,260,510 B2 * 8/2007 Sumida ................ G06F 30/367
                                                       703/2

FOREIGN PATENT DOCUMENTS

CN        106067677    * 11/2016
CN        106682369    *  5/2017

OTHER PUBLICATIONS

WIPO, ISR of PCT/CN2017/114463, dated Feb. 26, 2018.

\* cited by examiner

*Primary Examiner* — Phuong Huynh
(74) *Attorney, Agent, or Firm* — Hodgson Russ LLP

(57) ABSTRACT

A state estimation method for a heat supply network in a steady state based on a bilateral equivalent model is provided. The method includes: establishing the bilateral equivalent model based on a mass flow rate in each supply branch of the heating network, a mass flow rate in each return branch of the heating network, a mass flow rate in each connecting branch of the heating network, a pressure and a temperature of each node in the heating network, wherein each heat source is configured as a connecting branch and each heat load is configured as a connecting branch; and repeatedly performing a state estimation on the heating network based on the bilateral equivalent model, until a coverage state estimation result is acquired.

13 Claims, 1 Drawing Sheet

(51) Int. Cl.
*F24D 19/10* (2006.01)
*G01F 1/86* (2006.01)

STATE ESTIMATION METHOD FOR HEATING NETWORK IN STEADY STATE BASED ON BILATERAL EQUIVALENT MODEL

CROSS-REFERENCE TO RELATED APPLICATION

This application is a continuation of International Application No. PCT/CN2017/114463, filed Dec. 4, 2017, which claims priority to Chinese Patent Application No. 201710957867.X, filed Oct. 16, 2017, the entire disclosures of which are incorporated by reference herein.

FIELD

The present disclosure relates to a state estimation method for a heating network in a steady state based on a bilateral equivalent model, belonging to the technical field of the operation and control of comprehensive energy systems.

BACKGROUND

According to different heating mediums, heating networks can be divided into two categories: hot-water heat-supply networks and steam heat-supply networks. At present, most of China's industrial heating supply uses medium or high pressure steam heat supply networks, and civil heating supply mostly uses hot-water heat-supply networks. In the present disclosure, the hot-water heat-supply network is taken for analysis. According to whether there is a return network, the heating network can be divided into two types: an open network and a closed network.

For the open network, only the supply network of the heating network needs to be analyzed, while for the closed network, it is necessary to study both the supply network and the return network. Generally speaking, for the closed network, the supply network and the return network have the same topological structure. In the prior art, when analyzing the supply network and the return network individually, it is considered that the mass flow rate of each pipeline in the supply network and the return network is approximately the same. Therefore, only the hydraulic operating conditions of the supply network are analyzed, and on this basis, the thermal operating conditions of the supply network and the return network are analyzed. However, this method cannot handle asymmetry circumstances between the supply network and the return network. For example, when a line in the supply network or the return network fails or is being repaired, it will inevitably lead to the asymmetry between the supply network and the return network. On the other hand, the purpose of state estimation is to monitor the operation of the entire network. If the symmetric processing is simply performed, the operating conditions of the return network cannot be monitored.

SUMMARY

The purpose of the present disclosure is to propose a state estimation method for a heating network in a steady state based on a bilateral equivalent model. The method may include: establishing the bilateral equivalent model based on a mass flow rate in each supply branch of the heating network, a mass flow rate in each return branch of the heating network, a mass flow rate in each connecting branch of the heating network, a pressure and a temperature of each node in the heating network, in which each heat source is configured as a connecting branch and each heat load is configured as a connecting branch; and repeatedly performing a state estimation on the heating network based on the bilateral equivalent model, until a coverage state estimation result is acquired.

DETAILED DESCRIPTION

The state estimation method for steady state operation of a heating network based on a bilateral equivalent model proposed by the present disclosure includes the following steps.

(1) A node-branch incidence matrix for the bilateral equivalent model of the heating network is established, which includes followings.

Figure 1:
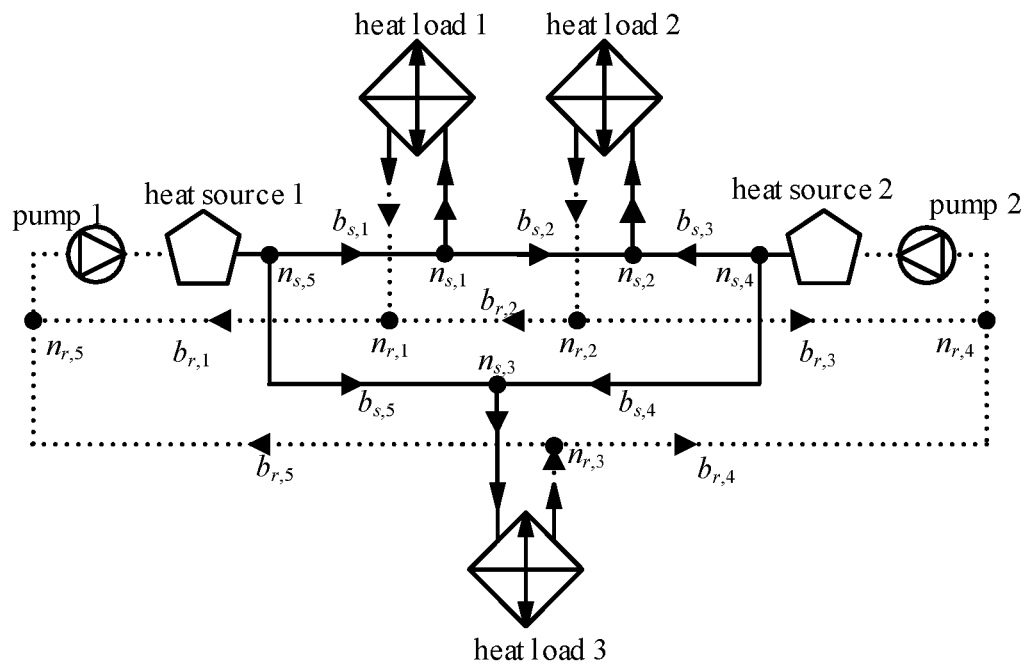
FIG. 1 is a schematic structural diagram of a heating network involved in a method of the present disclosure.

The structure of the heating network involved in the method of the present disclosure is illustrated in FIG. 1, in which the solid lines represent supply branches in the heating network, and the dashed lines represent return branches in the heating network. In the bilateral equivalent model of the heating network, both the supply branches and the return branches of the heating network are taken into consideration, and a heat source and a heat load are equivalent to connecting branches which are represented by dashed lines in FIG. 2. For a heating network composed of N nodes and B branches, the following matrix representing the relationship among the nodes and branches is formed.

Figure 2:
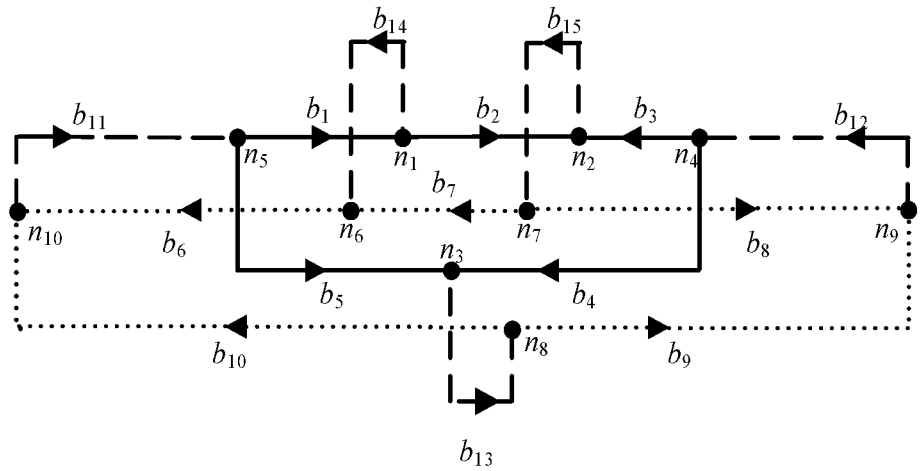
FIG. 2 is a schematic structural view of a heating network components after equivalent processing involved in a method of the present disclosure.

(1-1) a node-branch incidence matrix A:

The node-branch incidence matrix A represents the topological relationship among nodes and branches in the network. The matrix A consists of three elements: 0, 1, and −1. The elements in the matrix A are defined as follows:

$$A_{ij} = \begin{cases} 1 & \text{representing that node } i \text{ is a headend node of branch } j \\ -1 & \text{representing that node } i \text{ is a tailend node of branch } j \\ 0 & \text{representing that node } i \text{ is not an end of branch } j \end{cases}$$

where i represents any node in the heating network, and j represents any branch in the heating network, i=1, 2, ..., N, and j=1, 2, ..., B. As shown in FIG. 2, the nodes are represented by n, and the branches are represented by b.

(1-2) a positive node-branch incidence matrix $A_f$:

The positive node-branch incidence matrix $A_f$ represents the relationship among the headend nodes of the respective branches and the branches, $A_f = \{A | A_{ij} > 0\}$, and the elements in the matrix $A_f$ are defined as follows:

$$A_{fij} = \begin{cases} 1 & \text{representing that node } i \text{ is a headend node of branch } j \\ 0 & \text{representing that node } i \text{ is not a headend node of branch } j \end{cases}$$

where i=1, 2, ..., N, and j=1, 2, ..., B.

(1-3) a negative node-branch incidence matrix $A_t$:

The negative node-branch incidence matrix $A_t$ represents the relationship among the tailend nodes of the respective branches and the branches, $A_t=\{-A|A_{ij}<1\}$, and the elements in the matrix $A_t$ are defined as follows:

$$A_{tij} = \begin{cases} 1 & \text{representing that node } i \text{ is a tailend} \\ & \text{node of branch } j \\ 0 & \text{representing that node } i \text{ is not a tailend} \\ & \text{node of branch } j \end{cases}$$

where i=1, 2, ..., N, and j=1, 2, ..., B.

(2) A state estimation is performed on the heating network in steady state operation based on the bilateral equivalent model.

(2-1) A convergence accuracy $\delta$ and a maximum number of cycles d of the state estimation for the heating network are set, and a number of cycles a is set to 0 during initialization.

(2-2) The real-time measured operation data of the heating network at a time point t is obtained from a supervisory control and data acquisition system of the heating network, including a pressure H of each node in the heating network, a mass flow rate m of a branch between any two nodes, and a head-end temperature $T_f$ and a tailend temperature $T_t$ of a branch between two nodes, a thermal power $\phi^q$ of connecting branches (as illustrated by the dashed lines in FIG. 2) which are equivalent from a heat source and a heat load, in which the superscript q represents a connecting branch. The above operation data constitutes a column vector $z_h$ of measurement values.

(2-3) A column vector $x_h$ is constituted by all the state values to be estimated for the heating network, including a pressure $\hat{H}$ of each node in the heating network, a headend temperature $\hat{T}_f$ and a tailend temperature $\hat{T}_t$ of the branch between any two nodes.

(2-4) A measurement function $f(x)$ describing a relation between a measurement value and a state value of the heating network is established, in which $f(x)=f(x_h)$, and $f(x_h)$ is a group of equations describing the thermal system flow, including the following equations:

(2-4-1) a branch pressure loss equation:

The branch pressure loss equation represents a pressure difference between the nodes at the two ends of the branch. The branch pressure loss equation is represented in a matrix form as follows.

$$A^T H = \Delta H - H_p$$

where H represents a column vector composed of the pressures of the nodes in the heating network in the above step (2-2), $A^T$ represents a transposed matrix of the node-branch incidence matrix A in the above step (1-1), and $H_p$ represents a column vector composed of lifts of pumps on the branches, in which $H_p = am_p^2 + bm_p + c$, where a, b, and c are pump parameters, which are obtained from the product nameplate of the pumps, $m_p$ represents a mass flow rate of the branch where the pump is located, and $\Delta H$ represents a column vector composed of pressure losses of respective branches in the heating network, in which $\Delta H$ is calculated with the following equation.

$$\Delta H = K \cdot m \cdot |m|$$

where K represents a friction coefficient of the branch in the heating network, which ranges from 10 to 500 Pa/(kg/s)$^2$, and m represents a mass flow rate of any branch in the heating network.

(2-4-2) a thermal power equation of a connecting branch:

The thermal power equation represents the headend-to-tailend temperature relation of a connecting branch q, which is expressed by the following equation.

$$\phi^q = C_p m^q (T_f^q - T_t^q)$$

where the superscript q represents the connecting branch, $\phi^q$ represents a heating power of the connecting branch, the value of the heating power at the heat load is positive, the value of the heating power at the heat source is negative, and $C_p$ is a specific heat capacity of a heating medium, which is obtained from a physical parameter table of fluid, $m^q$ represents a mass flow rate of the connecting branch, $T_f^q$ represents a temperature at a headend of the connecting branch, and $T_t^q$ represents a temperature at a tailend of the connecting branch.

(3) According to the measurement values of the above step (2-2), an objective function of state estimation for steady state operation of a heating network is established as follows.

$$\min J(x_h) = \min\{[z_h - f(x_h)]^T W [z_h - f(x_h)]\}$$

where W represents a covariance matrix of the measurement values, the superscript T represents matrix transposition, and $J(x_h)$ is an expression of the objective function.

(4) Constraint conditions $c(x_h)$ for the steady state operation of the heating network is established, including followings.

(4-1) Mass flow continuity constraints for all nodes are established, and the mass flow continuity constraints are expressed in a matrix form as follows.

$$AM = 0$$

where M represents a column vector composed of mass flow rates of respective branches in the heating network. The supply branch and the return branch are uniformly equivalent to an ordinary branch, which is represented by the superscript p, and the connecting branch is equivalent to a special branch, which is represented by the superscript q. Thus, M is represented by the following equation.

$$M = \begin{bmatrix} M^p \\ M^q \end{bmatrix}$$

where $M^p$ represents a sub-vector composed of mass flow rates of the ordinary branches (i.e., the supply branch and the return branch), and $M^q$ represents a sub-vector composed of the mass flow rates of the connecting branch.

(4-2) Temperature mixing constraints for all nodes in the heating network are established.

$$(\Sigma m_{out}) T_n = \Sigma(m_{in} T_{in})$$

where $m_{out}$ represents a mass flow rates of the heating medium in a branch flowing out of a node, $m_{in}$ represents a mass flow rates of the heating medium in a branch flowing into a node, $T_n$ represents a temperature of the heating medium after being mixed at the node, and $T_{in}$ represents a temperature of the heating medium in different branches before being mixed at the node.

The temperature $T_{in}$ of the heating medium in branches before being mixed at the node is replaced by the tailend temperature $T_t$ of different branches, then the temperature mixing constraints for nodes may be represented in a matrix form as follows.

$$\text{diag}(A_f M)T_n = A_t \, \text{diag}(M)T_t$$

where $A_f$ and $A_t$ represent the positive node-branch incidence matrix in the above step (1-2) and the negative node-branch incidence matrix in the above step (1-3) respectively, and diag(•) represents a diagonal matrix.

(4-3) Branch temperature drop constraints are established for all ordinary branches in the heating network. The branch temperature drop constraints are represented in a matrix form as follows.

$$T_t^p - T_a = (T_f^p - T_a) e^{-\frac{\lambda L}{C_p M^p}}$$

where $T_a$ represents an ambient temperature, $T_t^p$ represents a tailend temperature of the ordinary branch, $T_f^p$ represents a headend temperature of the ordinary branch, L represents a length of the ordinary branch, and $\lambda$ represents a heat transfer coefficient of the ordinary branch in the heating network, the heat transfer coefficients of different materials are different, and the value of the heat transfer coefficient ranges from zero to a few hundreds, which may be obtained in the corresponding data manual, e is the natural logarithm, $C_p$ represents a specific heat capacity of a heating medium, and $M^p$ represents a sub-vector composed of mass flow rates of the ordinary branches (i.e., the supply branch and the return branch).

(5) A Lagrangian function is constituted with the objective function in the above step (3) and the constraints in the above step (4) using a Lagrangian multiplier method, which is represented as follows.

$$L(x_h, \omega) = J(x_h) + \omega^T c(x_h)$$

where $J(x_h)$ represents the objective function in the above step (3), $\omega$ represents a Lagrangian multiplier, $c(x_h)$ represents the constraint conditions for the steady state operation of the heating network established in the above step (4), and the superscript T represents matrix transposition.

The Newton-Raphson method in the optimization theory is used to solve the Lagrangian function for the steady state operation of the heating network to obtain a state estimation result for the steady state operation of the heating network.

(6) A convergence judgment is performed on the state estimation result in the above step (5).

If the number of cycles a reaches a preset number of cycles d, that is, a≥d, the current state estimation result is determined as a state estimation result for steady state operation of the heating network based on the bilateral equivalent model at a time point t.

If the number of cycles a does not reach the preset number of cycles d, that is, a<d, the convergence judgement is further performed on the state estimation result according to the accuracy $\delta$ of the state estimation for the heating network. If a difference between estimation values $x_a$ and $x_{a-1}$ of state variables in two latest state estimation results is smaller than the accuracy $\delta$ of the state estimation, that is, max|$x_a - x_{a-1}$|<$\delta$, the current state estimation result is determined as the state estimation result for steady state operation of the heating network based on the bilateral equivalent model at the time point t. If the difference between estimation values $x_a$ and $x_{a-1}$ of state variables in two latest state estimation results is greater than or equal to the accuracy $\delta$ of the state estimation, that is, max|$x_a - x_{a-1}$|≥$\delta$, the state variables are updated, and the pressure of the node in the heating network and the headend temperature and the tailend temperature of the branch are updated according to the temperature obtained by the current state estimation, a=a+1 is set, and a process of the current state estimation is continued by returning to step (4).

What is claimed is:

1. A state estimation method for a heating network in a steady state based on a bilateral equivalent model, comprising:
    establishing the bilateral equivalent model based on a mass flow rate in each supply branch of the heating network, a mass flow rate in each return branch of the heating network, a mass flow rate in each connecting branch of the heating network, a pressure and a temperature of each node in the heating network, wherein each heat source is configured as a connecting branch and each heat load is configured as a connecting branch;
    repeatedly performing a state estimation on the heating network based on the bilateral equivalent model, until a coverage state estimation result is acquired, comprising:
        setting a convergence accuracy $\delta$ and a maximum number of cycles d of the state estimation, and initializing a number of cycles a to 0;
        performing a state estimation calculation on an objective function and constraint conditions by utilizing a Lagrange multiplier method and a Newton-Raphson method to acquire a state estimation result $x_a$,
        if a≥d, determining the state estimation result $x_a$ as the coverage state estimation result for the heating network; and
        if a<d, determining whether a difference between two state estimation results $x_a$ and $x_{a-1}$ is smaller than the convergence accuracy $\delta$, if max|$x_a - x_{a-1}$|<$\delta$, determining the state estimation result $x_a$ as the coverage state estimation result, and if max|$x_a - x_{a-1}$|≤$\delta$, updating the pressure and the temperature of each node in the heating network according to estimated values obtained in the state estimation calculation and updating the constraint conditions based on the updated temperature and the updated pressure of each node, setting a=a+1, and performing the state estimation calculation on the objective function and the updated constraint conditions; and
    monitoring an operating condition of the heating network based on the coverage state estimation result.

2. The method of claim 1, wherein establishing the bilateral equivalent model based on the mass flow rate in each supply branch of the heating network, the mass flow rate in each return branch of the heating network and the mass flow rate in each connecting branch of the heating network, the pressure and the temperature of each node in the heating network comprises:
    establishing a node-branch incidence matrix of the heating network, in which the node-branch incidence matrix represents relations between nodes and branches in the heating network;
    establishing a measurement function describing relations between measurement values and state values of the heating network based on the node-branch incidence matrix of the heating network;
    establishing the objective function for the heating network based on the measurement function and the measurement values; and establishing the constraint conditions for the heating network based on the mass flow rate in the supply branch, the mass flow rate in the return branch and the mass flow rate in the connecting branch, the temperature of each node in the heating network.

3. The method of claim 2, wherein establishing a node-branch incidence matrix of the heating network comprises:
establishing a node-branch incidence matrix A representing topological relations between the nodes and the branches, in which, $$A_{ij} = \begin{cases} 1 & \text{representing that node } i \text{ is a headend node of branch } j \\ -1 & \text{representing that node } i \text{ is a tailend node of branch } j \\ 0 & \text{representing that node } i \text{ is not an end of branch } j, \end{cases}$$

where i represents a node in the heating network, and j represents a branch in the heating network, i=1, 2, ..., N, and j=1, 2, ..., B, N and B are positive integers;
establishing a positive node-branch incidence matrix $A_f$ representing relations between the branches and headend nodes of the branches, in which $A_f=\{A|A_{ij}>0\}$, and $$A_{fij} = \begin{cases} 1 & \text{representing that node } i \text{ is a headend node of branch } j \\ 0 & \text{representing that node } i \text{ is not a headend node of branch } j; \end{cases}$$

establishing a negative node-branch incidence matrix $A_t$ representing relations between the branches and tailend nodes of the branches, in which $A_t=\{-A|A_{ij}<0\}$, and $$A_{tij} = \begin{cases} 1 & \text{representing that node } i \text{ is a tailend node of branch } j \\ 0 & \text{representing that node } i \text{ is not a tailend node of branch } j. \end{cases}$$

4. The method of claim 2, wherein establishing the measurement function describing relations between the measurement values and the state values of the heating network based on the node-branch incidence matrix of the heating network comprises:
acquiring operation data of the heating network at a time point t to constitute a column vector $z_h$ of the measurement values, wherein the operation data comprises a pressure H of each node in the heating network, a mass flow rate m of a branch between two nodes in the heating network, and a headend temperature $T_f$ and a tailend temperature $T_t$ of the branch, a thermal power $\phi^q$ of each connecting branch, in which q represents the connecting branch;
constituting a column vector $x_h$ of the state values to be estimated for the heating network, wherein the state values to be estimated comprise a to-be-estimated pressure $\hat{H}$ of each node in the heating network, a to-be-estimated headend temperature $\hat{T}_f$ and a to-be-estimated tailend temperature $\hat{T}_t$ of the branch between two nodes in the heating network, and establishing the measurement function $f(x)$ based on the column vector $z_h$, the column vector $x_h$ and the node-branch incidence matrix, in which $f(x)=f(x_h)$, and $f(x_h)$ represents a group of equations comprising a branch pressure loss equation and a thermal power equation of the connecting branch.

5. The method of claim 4, wherein the branch pressure loss equation represents a pressure difference between nodes at two ends of a branch, and is represented as:

$$A^T H = \Delta H - H_p$$

where H represents a column vector composed of pressures of the nodes in the heating network, $A^T$ represents a transposed matrix of the node-branch incidence matrix A, and $H_p$ represents a column vector composed of lifts of pumps on the branches, in which $H_p = a m_p^2 + b m_p + c$, where a, b, and c represents pump parameters, $m_p$ represents a mass flow rate of the branch where a pump is located, and $\Delta H$ represents a column vector composed of pressure losses of the branches in the heating network, in which $\Delta H$ is calculated by an equation of:

$$\Delta H = K \cdot m \cdot |m|$$

where K represents a friction coefficient of the branch in the heating network, and ranges from 10 to 500 Pa/(kg/s)$^2$, and m represents a mass flow rate of the branch in the heating network.

6. The method of claim 4, wherein the thermal power equation of the connecting branch represents a headend-to-tailend temperature relation of the connecting branch, and is represented as:

$$\phi^q = C_p m^q (T_f^q - T_t^q)$$

where q represents the connecting branch, $\phi^q$ represents a heating power of the connecting branch, the value of the heating power at the heat load is positive, the value of the heating power at the heat source is negative, and $C_p$ represents a specific heat capacity of a heating medium, $m^q$ represents a mass flow rate of the connecting branch, $T_f^q$ represents a headend temperature of the connecting branch, and $T_t^q$ represents a tailend temperature of the connecting branch.

7. The method of claim 4, wherein the objective function is represented as:

$$\min J(x_h) = \min\{[z_h - f(x_h)]^T W [z_h - f(x_h)]\}$$

where W represents a covariance matrix of the measurement values, the superscript T represents matrix transposition, and $J(x_h)$ represents an expression of the objective function.

8. The method of claim 2, wherein the constraint conditions comprise: a mass flow continuity constraint for the nodes in the heating network, a temperature mixing constraint for the nodes in the heating network, and a branch temperature drop constraint for the supply branches and the return branches in the heating network.

9. The method of claim 8, wherein the mass flow continuity constraint is represented as:

$$AM = 0$$

where M represents a column vector composed of mass flow rates of the branches in the heating network, and M is represented by an equation of:

$$M = \begin{bmatrix} M^p \\ M^q \end{bmatrix}$$

where $M^p$ represents a sub-vector composed of mass flow rates of the supply branches and mass flow rates of the return branches, and $M^q$ represents a sub-vector composed of mass flow rates of the connecting branches.

10. The method of claim 8, wherein the temperature mixing constraint is represented as:

$(\Sigma m_{out})T_n = \Sigma(m_{in} T_{in})$ where $m_{out}$ represents an outgoing mass flow rate of a branch through which heating medium flows out of a node, $m_{in}$ represents an incoming mass flow rate of a branch through which the heating medium flows into a node, $T_n$ represents a temperature of the heating medium after being mixed at the node, and $T_{in}$ represents a temperature of the heating medium from distinct branch before being mixed at the node.

11. The method of claim 8, wherein the branch temperature drop constraint is represented as:

$$T_t^p - T_a = (T_f^p - T_a)e^{-\frac{\lambda L}{C_p M^p}}$$

where $T_a$ represents an ambient temperature, $T_t^p$ represents a tailend node temperature of a general branch, $T_f^p$ represents a headend node temperature of the general branch, L represents a length of the general branch, and $\lambda$ represents a heat transfer coefficient of the general branch, e represents natural logarithm, $C_p$ represents a specific heat capacity of a heating medium, and $M^p$ represents a sub-vector composed of flows of the general branch, where the general branch is selected from the supply branch and the return branch.

12. The method of claim 10, wherein the temperature $T_{in}$ of the heating medium from distinct branch before being mixed at the node is replaced by a tailend node temperature $T_t$ of the branch, then the temperature mixing constraint is represented as:

$\text{diag}(A_f M)T_n = A_t \text{diag}(M)T_t$ where $A_f$ and $A_t$ represent a positive node-branch incidence matrix and a negative node-branch incidence matrix respectively, and diag(•) represents a diagonal matrix.

13. The method of claim 1, wherein performing the state estimation calculation on the objective function and the constraint conditions by utilizing the Lagrange multiplier method and the Newton-Raphson method to acquire the state estimation result $x_a$ comprises:

constituting a Lagrangian function with the objective function and the constraint conditions using the Lagrangian multiplier method, which is represented as:

$L(x_h, \omega) = J(x_h) + \omega^T c(x_h)$ where $J(x_h)$ represents the objective function, $\omega$ represents a Lagrangian multiplier, $c(x_h)$ represents the constraint conditions, and T represents matrix transposition; and solving the Lagrangian function using the Newton-Raphson method to obtain the state estimation result $x_a$.

* * * * *